(12) United States Patent
Gong et al.

(10) Patent No.: US 10,949,314 B2
(45) Date of Patent: Mar. 16, 2021

(54) METHOD AND APPARATUS FOR FAILURE RECOVERY OF STORAGE DEVICE

(71) Applicant: EMC IP Holding Company LLC, Hopkinton, MA (US)

(72) Inventors: Shaoqin Gong, Beijing (CN); Lifeng Yang, Beijing (CN); Jian Gao, Beijing (CN); Haiying Tang, Beijing (CN); Xiaobo Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/288,928

(22) Filed: Feb. 28, 2019

(65) Prior Publication Data

US 2019/0324875 A1 Oct. 24, 2019

(30) Foreign Application Priority Data

Apr. 20, 2018 (CN) .......................... 201810361640.3

(51) Int. Cl.
*G06F 11/20* (2006.01)

(52) U.S. Cl.
CPC ...... *G06F 11/2094* (2013.01); *G06F 2201/82* (2013.01)

(58) Field of Classification Search
CPC .................... G06F 11/2094; G06F 2201/80
See application file for complete search history.

(56) References Cited

U.S. PATENT DOCUMENTS

| 10,210,045 | B1 | 2/2019 | Gao et al. |
| 10,289,336 | B1 | 5/2019 | Liu et al. |
| 10,409,682 | B1* | 9/2019 | Davies ................ G06F 11/1084 |
| 10,459,814 | B2 | 10/2019 | Gao et al. |
| 10,552,078 | B2 | 2/2020 | Gong et al. |
| 10,606,651 | B2* | 3/2020 | Burger .................. G06F 9/3885 |

(Continued)

FOREIGN PATENT DOCUMENTS

CN 101639901 A * 2/2010

OTHER PUBLICATIONS

Zhang et al., Optimizing fpga-based accelerator design for deep convolutional neural networks, 2015, Proceedings of the 2015 ACM/SIGDA international symposium on field-programmable gate arrays (Year: 2015).*

(Continued)

*Primary Examiner* — Matthew M Kim
*Assistant Examiner* — Matthew N Putaraksa
(74) *Attorney, Agent, or Firm* — BainwoodHuang (57) ABSTRACT

Techniques perform failure recovery of a storage device. The techniques involve: determining, based on failure data indicating at least one failed disk, whether the at least one failed disk comprises a system disk associated with an extent pool of the storage device, the extent pool being built based on system disks and user disks; in response to determining that the at least one failed disk comprises a system disk, rebuilding the user data of the system disk to one or more further disks associated with the extent pool; and in response to the system disk being replaced with an updated system disk, restoring the rebuilt user data from the one or more further disks to the updated system disk, an association of the system disk with the extent pool being maintained until the system disk is replaced by the updated system disk.

20 Claims, 6 Drawing Sheets

(56) References Cited

U.S. PATENT DOCUMENTS

| | | | | |
|---|---|---|---|---|
| 10,652,329 | B1* | 5/2020 | Gritter | H04L 67/1097 |
| 2006/0218363 | A1* | 9/2006 | Palapudi | G06F 11/1461 |
| | | | | 711/162 |
| 2010/0251012 | A1* | 9/2010 | Zwisler | G06F 11/1092 |
| | | | | 714/6.32 |
| 2012/0059990 | A1* | 3/2012 | Iida | G06F 11/2082 |
| | | | | 711/114 |
| 2013/0145091 | A1* | 6/2013 | Klemm | G06F 3/0644 |
| | | | | 711/114 |
| 2016/0277348 | A1* | 9/2016 | Pitio | H04L 51/34 |
| 2016/0321081 | A1* | 11/2016 | Kim | H04L 67/12 |
| 2017/0185335 | A1* | 6/2017 | Pardoe | G06F 1/3296 |
| 2018/0004455 | A1* | 1/2018 | Kim | G06F 3/0617 |
| 2019/0286973 | A1* | 9/2019 | Kovvuri | G06N 3/063 |
| 2020/0151549 | A1* | 5/2020 | Hwang | G06F 17/15 |
| 2020/0193274 | A1* | 6/2020 | Darvish Rouhani | |
| | | | | G06N 3/0454 |

OTHER PUBLICATIONS

CN-101639901-A Machine Translated English, 2009 (Year: 2009).*

* cited by examiner

METHOD AND APPARATUS FOR FAILURE RECOVERY OF STORAGE DEVICE

FIELD

The subject matter described herein relates to failure recovery of a storage device, and more specifically to a method and apparatus for failure recovery of a storage device, a device and a computer program product.

BACKGROUND

In order to better manage and optimize data storage performance, a storage device usually divides and pools several system disks and user disks into an extent pool. In a conventional failure recovery solution of the storage device, after the user data on the failed system disk is rebuilt on other user disks in the extent pool, the failed system disk does not belong to the extent pool any longer. After a certain period of time, the user uses a new system disk to replace the failed system disk physically.

Since an available storage space of the system disk is usually less than the storage space of the user disk, the user disk for rebuilding the user data in the failed system disk has more free storage space which is not used yet. In addition, the free storage space on the newly-substituted system disk is also not used sufficiently. Hence, the free storage space existing on the user disk for rebuilding data and the newly-substituted system disk cannot be used sufficiently, thereby substantially reducing the I/O performance of the whole storage system.

SUMMARY

The subject matter described herein provides a failure recovery method and apparatus for a storage device, which can effectively use the storage space of the user disk and the substituted new system disk in the storage device, and thereby optimize the I/O performance of the storage system.

According to a first aspect of the present disclosure, there is provided a method for failure recovery of a storage device. The method includes: determining, based on failure data indicating at least one failed disk (or storage unit), whether the at least one failed disk includes a system disk associated with an extent pool of the storage device, wherein the extent pool being built based on system disks and user disks; in response to determining that the at least one failed disk includes a system disk, rebuilding the user data of the system disk to one or more further disks associated with the extent pool; and in response to the system disk being replaced with an updated system disk, restoring the rebuilt user data from the one or more further disks to the updated system disk, an association of the system disk with the extent pool being maintained until the system disk is replaced by the updated system disk.

According to a second aspect of the present disclosure, there is provided an apparatus for failure recovery of a storage device. The apparatus includes: a storage unit configured to store one or more programs; a processor coupled to the storage unit and configured to execute the one or more programs to cause the apparatus to perform acts including: determining, based on failure data indicating at least one failed disk, whether the at least one failed disk includes a system disk associated with an extent pool of the storage device, wherein the extent pool being built based on system disks and user disks; in response to determining that the at least one failed disk includes a system disk, rebuilding the user data of the system disk to one or more further disks associated with the extent pool; and in response to the system disk being replaced with an updated system disk, restoring the rebuilt user data from the one or more further disks to the updated system disk, an association of the system disk with the extent pool being maintained until the system disk is replaced by the updated system disk.

According to a third aspect of the present disclosure, there is provided a computer program product. The computer program product being tangibly stored on non-transient computer readable medium and including machine executable instructions, the machine executable instructions, when being executed, causing a machine to perform steps of the method according to the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objects, features and advantages of the present disclosure will be made more apparent by describing example embodiments of the present disclosure in more detail with reference to figures, wherein identical reference signs represent identical parts in the example embodiments of the present disclosure.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail with reference to figures. Although the figures show preferred embodiments of the present disclosure, it should be appreciated that the present disclosure may be implemented in various forms and should not be limited by embodiments described here. On the contrary, these embodiments are provided to make the present disclosure more transparent and complete and convey the scope of the present disclosure completely to those skilled in the art.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As stated above, a conventional storage device failure recovery solution usually goes in a way that after the user data on the failed system disk is rebuilt on other user disks in the extends pool (e.g., rebuilt on other user disks in the same drive partner group of an extent pool of the extent pool), the free storage space of the current drive partner group might be insufficient for data rebuilding next time. Therefore, a disk swapping operation of the extent pool is performed, namely, an unused disk is selected from the system to replace the failed disk to supplement the free storage space in the current drive partner group. At this time, the already failed system disk does not belong to the extent pool any longer. After a certain period of time, the user uses a new system disk to physically update the failed system disk.

In the above solution, before the failed system disk is physically updated, it is already no longer associated with the original extent pool. Therefore, it is impossible to move user data rebuilt on other disks of the drive partner group in the original extent pool back to the updated system disk, so that the free storage space on the update system disk cannot be used effectively.

On the other hand, since the available capacity of the system disk is usually less than that of the user disk of the same specification, the user data of the failed system disk usually occupies a smaller storage space so that the occupied space of the user disk for rebuilding the user data of the failed system is also only a small portion of its available storage capacity. Therefore, in the conventional storage device failure recovery solution, the user disk for rebuilding the user data of the failed system disk also has a larger free storage space which is not used effectively.

Figure 1:
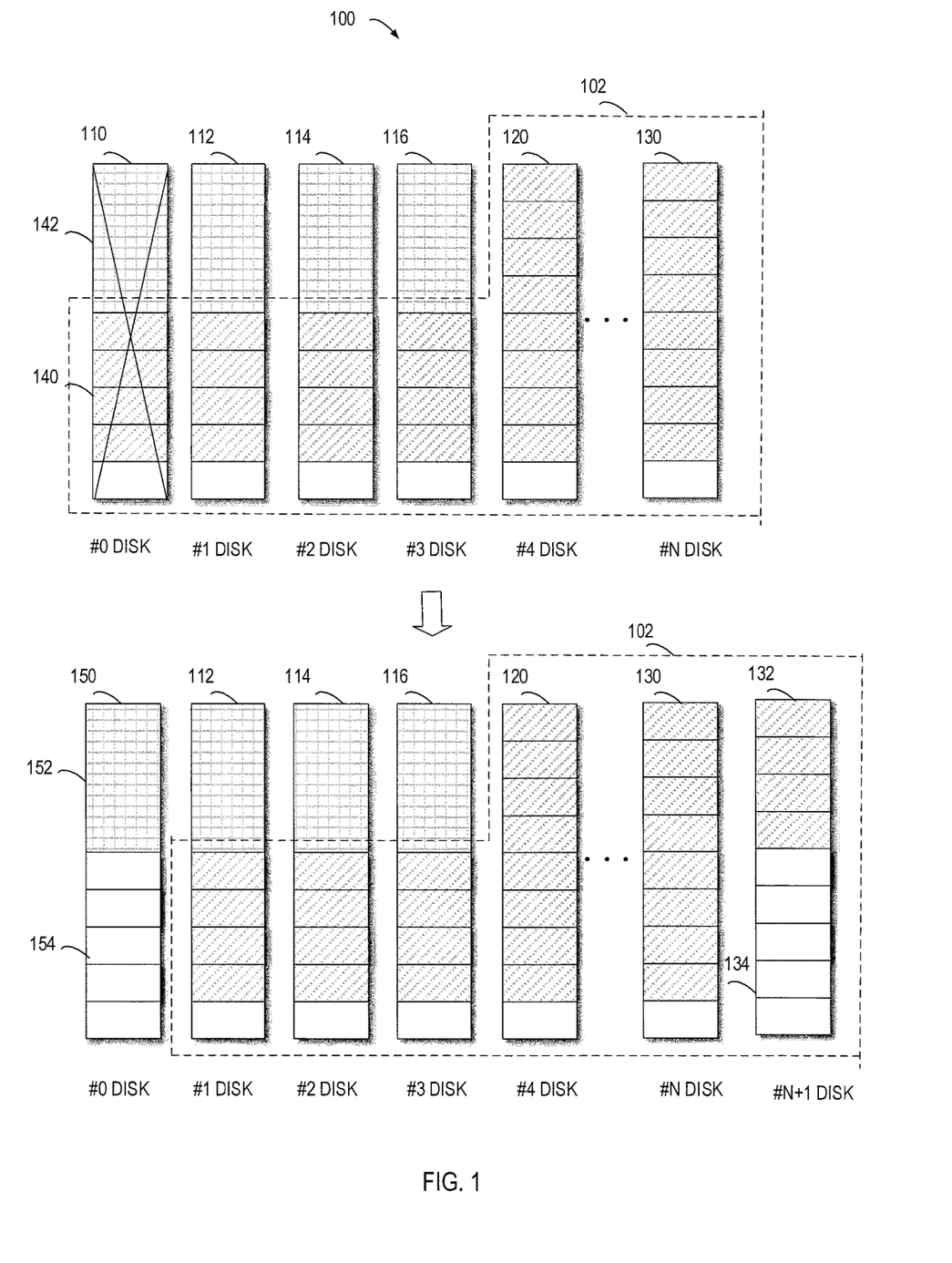
FIG. 1 illustrates a schematic diagram of a conventional storage device failure recovery solution.

For example, FIG. 1 illustrates a schematic diagram of a conventional storage device failure recovery solution. As shown in the figure, an extent pool 102 of a storage device 100 for example includes four system disks (or system storage units) and a plurality of user disks (or user storage units). The four system disks are #0 disk 110, #1 disk 112, #2 disk 114 and #3 disk 116 respectively. The plurality of user disks for example are #4 disk 120 to #N disk 130.

When the system disk (e.g., disk 110) fails, the user data 140 on the system disk will be rebuilt on another user disk 132 in the extends pool 102, namely, #N+1 disk 132, as shown by the lower side of FIG. 1. After the rebuilding of the user data 140 of the disk 110 is completed, the above-mentioned disk swapping operation is performed so that the failed disk 110 is no longer associated with the extent pool 102. After a certain period of time, for example, after one hour, when the user uses an updated system disk 150 to replace the disk 110, the updated system disk 150 is no longer associated with the extent pool 102, so it is impossible to move the user data rebuilt on the #N+1 disk 132 back to the updated system disk 150 so that the updated system disk 150 still has a larger free storage space not used effectively, after the system data is rebuilt. In addition, since the user data rebuilt on the #N+1 disk 132 only occupies a small portion of storage space on the disk 132, the disk 132 still has a larger free storage space not used effectively.

To conclude, the drawbacks of the conventional storage device failure recovery solution include: the user disk for rebuilding the user data and the updated system disk have a free storage space which cannot be used sufficiently.

To at least partially solve one or more of the above problems and other potential problems, example embodiments of the subject matter described herein provide a failure recovery solution for a storage device. It is possible to distinguish whether the failed disk is a system disk or a user disk. When the failed disk includes a system disk and before the user physically replaces the failed system disk, the system disk remains associated with the extent pool. Since in the solution the failed system disk is still associated with the original extent pool before being physically updated, it is possible to assist the updated system disk in establishing association with the extent pool, and assist the system in moving the user data rebuilt in the original extent pool back to or restore to the updated system disk. Therefore, the updated system disk not only stores the rebuilt system data but also stores the rebuilt user data so that the storage space on the updated system disk can be used sufficiently.

Figure 2:
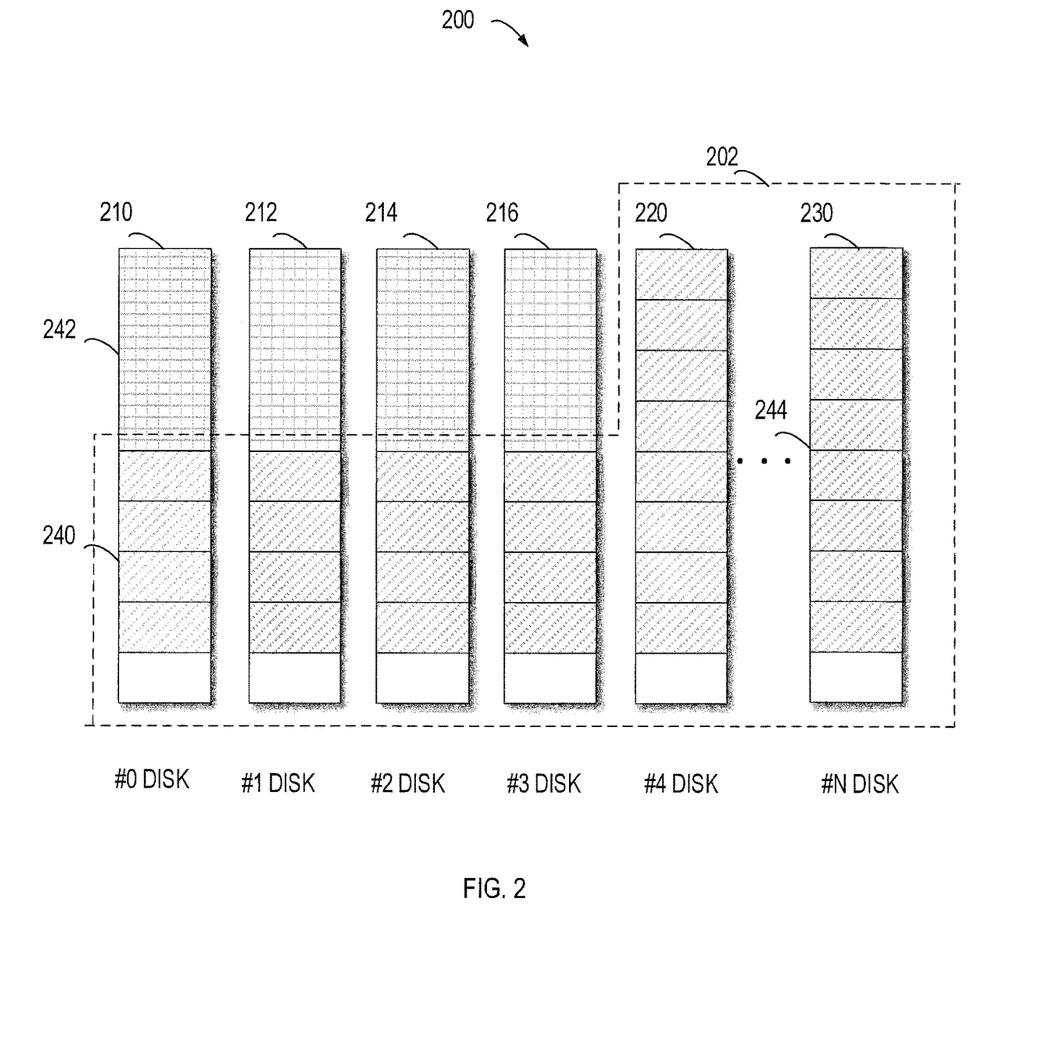
FIG. 2 illustrates a schematic diagram of a storage device according to an embodiment of the subject matter described herein.

FIG. 2 illustrates a schematic diagram of a storage device according to an embodiment of the subject matter described herein. As shown in FIG. 2, a storage device 200 includes an extent pool 202. The extent pool 202 usually includes a set of disks; it may be created by the user, expanded or shrink. The extent pool 202 is usually used to manage states of all extents, whether they are used, allocation and recovery of extents. Generally, as the number of disks in the extent pool 202 increases, the possibility that a plurality disks fail usually increases. Hence, the extent pool 202 is usually divided into a plurality of small drive partner groups, for example, the extent pool 202 is divided into a plurality of drive partner groups not exceeding 64 disks. The drive partner group is hereinafter referred to as DPG.

For the sake of clarity, FIG. 2 only illustrates that the extent pool 202 includes four system disk and a plurality of user disk. The four system disks for example are #0 disk 210 inserted at slot 0_0_0, #1 disk 212 inserted at slot 0_0_1, #2 disk 214 inserted at slot 0_0_2, and #3 disk 216 inserted at slot 0_0_3. The plurality of user disks for example are #4 disk 220 to #N disk 230. System data 242 and user data 240 are stored on the system disk (e.g., disk 210). User data 244 is stored on the user disk (e.g., disk 230).

Figure 3:
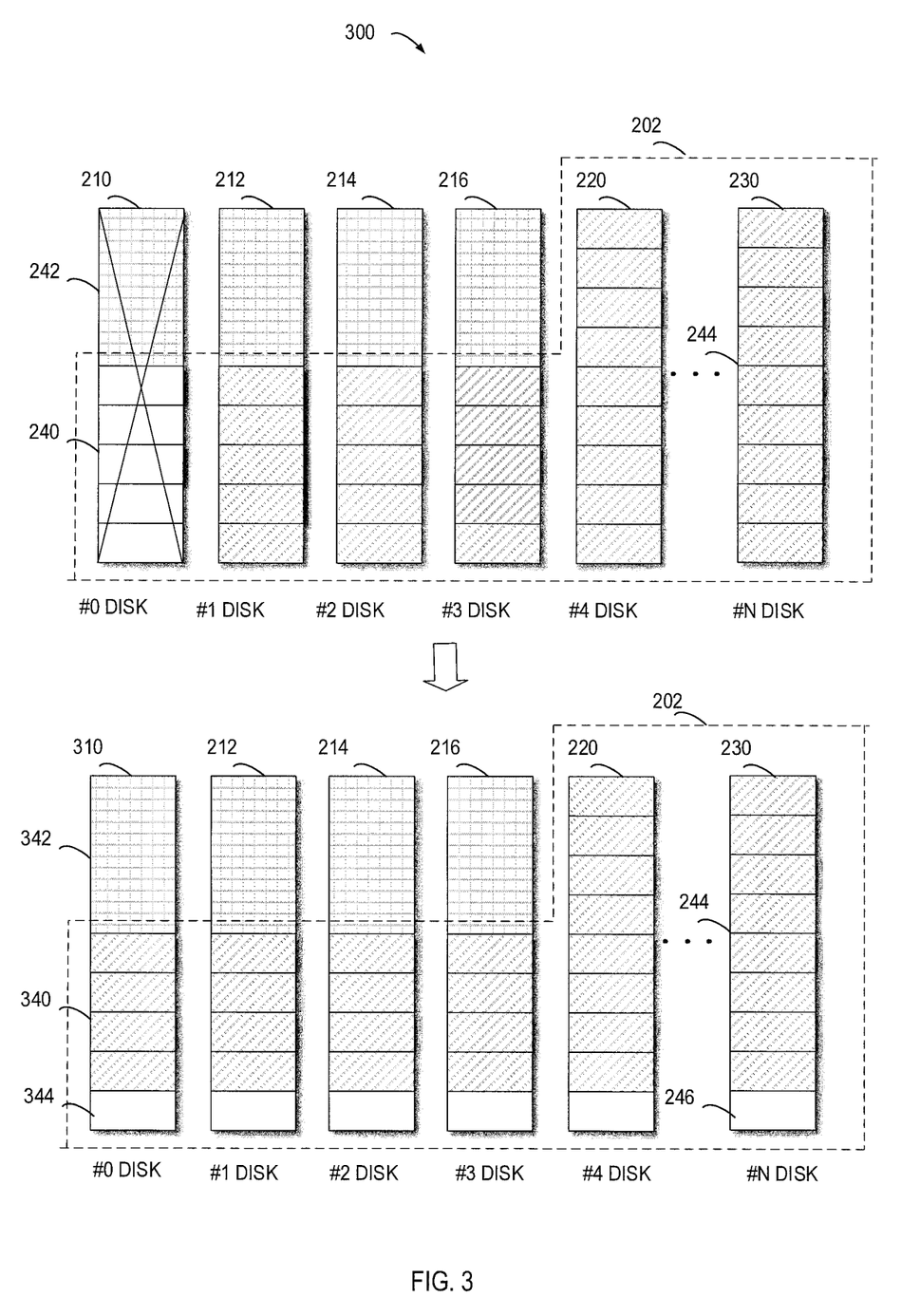
FIG. 3 illustrates a schematic diagram of a method for failure recovery of a storage device according to an embodiment of the subject matter described herein.

FIG. 3 illustrates a schematic diagram of a method for failure recovery of a storage device according to an embodiment of the subject matter described herein. As shown by the upper side of FIG. 3, when the system disk (e.g., disk 210) fails, the user data 240 on the system disk will be rebuilt on one or more further disks in the extent pool 202, for example rebuilt in the original free storage space of the #1 disk 212, #2 disk 214, #3 disk 216, #4 disk 220 to #N disk 230. After the rebuilding of the user data 240 of the failed disk 210 is completed, the disk 210 still remains associated with the extent pool 202, namely, the disk 210 still belongs to the extent pool 202 until the user uses the updated system disk 310 to update or replace the failed disk 210.

For example, as shown by the lower side of FIG. 3, after the user inserts the updated system disk 310 at the slot 0_0_0 to replace the failed disk 210, since the updated system disk 310 still belongs to the extent pool 202, the updated system disk 310, after its system data 342 is rebuilt or restored, restores the previously-rebuilt user data from one or more further disks of the extent pool 202 to the updated system disk 310. Therefore, the updated system disk 310 not only stores the rebuilt system data 342 but also stores the rebuilt user data 340. Hence, the storage space on the updated system disk 310 can be used effectively.

Figure 4:
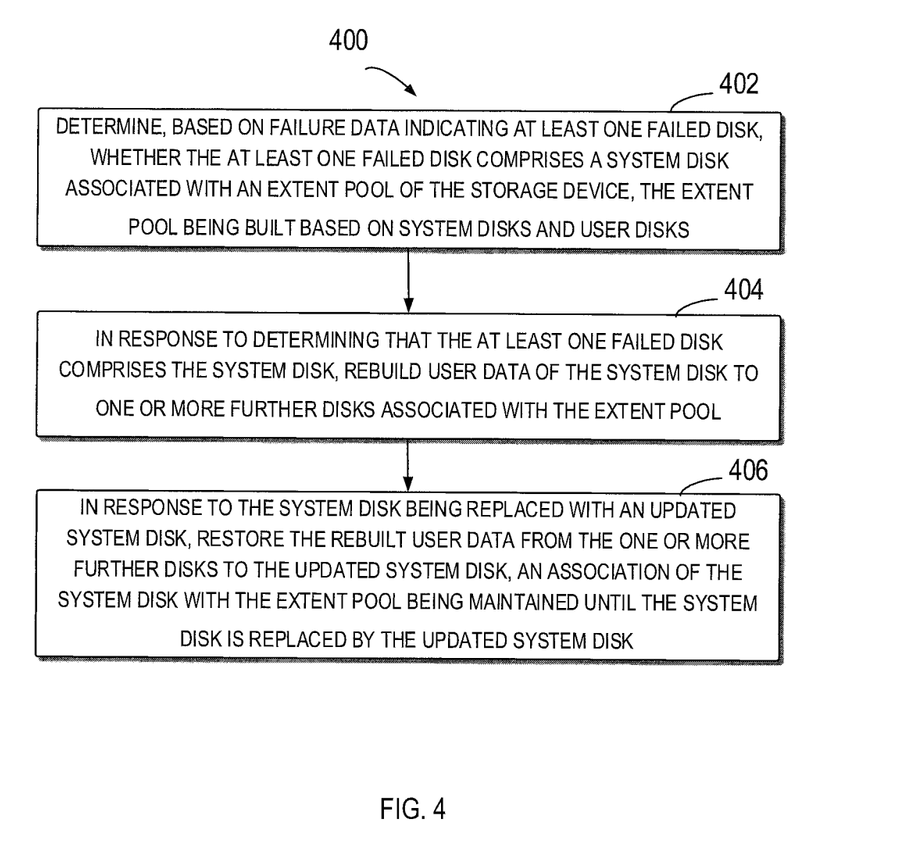
FIG. 4 illustrates a flow chart of a failure recovery method 400 for a storage device according to an embodiment of the subject matter described herein.

FIG. 4 illustrates a flow chart of a failure recovery method 400 for a storage device according to an embodiment of the subject matter described herein. In the embodiment shown in FIG. 4, various acts for example are executed by a processor. The method may further include additional acts not shown and/or shown acts may be omitted. The scope of the present disclosure is not limited in this aspect.

At block 402, determine, based on failure data indicating at least one failed disk, whether the at least one failed disk includes a system disk associated with the extent pool of the storage device, the extent pool being built based on the system disks and user disks. In some embodiments, the failure data at least includes one of the following data: a slot number of the failed disk, the number of failed disks, and failure duration of the failed disks. In some embodiments, it is possible to conveniently determine whether at least one failed disk includes a system disk by judging whether the slot number where the failed disk lied is a predetermined slot number. For example, if the slot number where the failed disk lies is any one or more of predetermined slot numbers 0_0_0, 0_0_1, 0_0_2 and 0_0_3 it may be determined that the failed disk includes the system disk. If the slot number where the failed disk lies is not a predetermined slot, for example, other slot numbers such as 0_0_4 other than the predetermined slot numbers, it may be determined that the failed disk is the user disk. Certainly, it is also possible to, in other manners, determine whether the failed disk includes a system disk associated with the extent pool of the storage device.

At block 404, in response to determining that at least one failed disk includes a system disk, rebuild the user data of the system disk to one or more further disks associated with the extent pool. In some embodiments, as shown in FIG. 3, when it is determined that the failed disk is a system disk, for example, when the disk 210 fails, the user data 240 on the system disk is rebuilt to the free storage space of the plurality of system disks and user disks in the extent pool 202.

Regarding the user data of the system disk being rebuilt to one or more further disks, in some embodiments, the system compares the failure duration of the system disk with a predetermined duration; and in response to the failure duration exceeding the predetermined duration, rebuilds all data of the system disk to the one or more further disks; and in response to the failure duration not exceeding the predetermined duration, only rebuild changed data of the failed system disk to the system disk. Reasons for employing the above technical means (e.g., specialized circuitry) are as follows: in some special cases, for example, if the system disk or user disk is not inserted at the slot not firmly enough, the system generates failure data indicative of the failure within a certain period of time. For example, software detects a relevant disk occurs in an online state and an offline state alternatingly, usually after a certain period of time, for example within 5 minutes, the disk which is indicated as failed recovers. The disk itself in the above case does not fail, and needn't be replaced physically. Therefore, according to the method for failure recovery of the storage device of the embodiment of the subject matter described here, when it is judged that the failure duration exceeds for example the predetermined 5 minutes, the data of the system disk is rebuilt to the one or more further disks; when it is judged that the failure duration does not exceed the predetermined 5 minutes, only the changed data of the failed disk is rebuilt to the failed disk. Through the above technical means (e.g., specialized circuitry), a disk which indicates a failure due to a temporary unstable factor and then recovers on its own needn't perform rebuilding of all data and subsequent disk physical replacement, and only needs to rebuild and restore changed data during instability on the disk itself. In this way, the failure recover of the storage device is more efficient, and system resources are saved more.

At block 406, in response to the system disk being replaced with an updated system disk, restore the rebuilt user data from the one or more further disks to the updated system disk, wherein the failed system disk remains associated with the extent pool until the failed system disk is replaced by the updated system disk. In some embodiments, after the updated system disk 310 is inserted by the user into a corresponding slot, it gets associated with the extent pool 202, the system data of the updated system disk 310 is rebuilt, and the user data of the original failed disk 210 can also be restored from #1 disk 212 to #N disk 230 to the updated system disk 310.

In some embodiments, the method 400 may further include: copying partial user data of other disks associated with the extent pool to the updated system disk, so that each disk associated with the extent pool has free storage space. In some embodiments, since the updated disk has a majority of free storage space, other disks might not have an available free storage space at this time. If the extent pool needs data rebuilding again, it only uses throughput of one disk. To use the throughput of all disks in the DPG of the extent pool in parallel, the extent pool uses extent copy to move some data from other disks to a new drive to ensure that each disk has free storage space for data rebuilding next time. This moving process may also be called shuffle in Extent Pool. In some embodiments, a Mapped Redundant Array of Independent Drives (Mapped RAID) algorithm is used to implement the abovementioned shuffle in the Extent pool. The mapped RAID has a better rebuilding performance than the conventional RAID. The data of the extents is copied to other disks by an extent copying operation. In some embodiments, it is possible to use the mapped RAID extent shuffle algorithm of EMC to implement the shuffle in the extent pool based on a use rate of the disk associated with the extent pool and a matrix corresponding to the disk, to evenly allocate the extents to all disks in the extent pool. As such, when a disk fails, all other disks will participate in the whole rebuilding process. In some embodiments, it is possible to, before activating the extent copy, select an available disk area as a copy target. When the extent which is proceeding is copied, write I/O is copied to the target. Upon completion of the extent copy, a source extent is marked as an available disk area. A copying process of a plurality of extents may be performed simultaneously in the extent pool.

Figure 5:
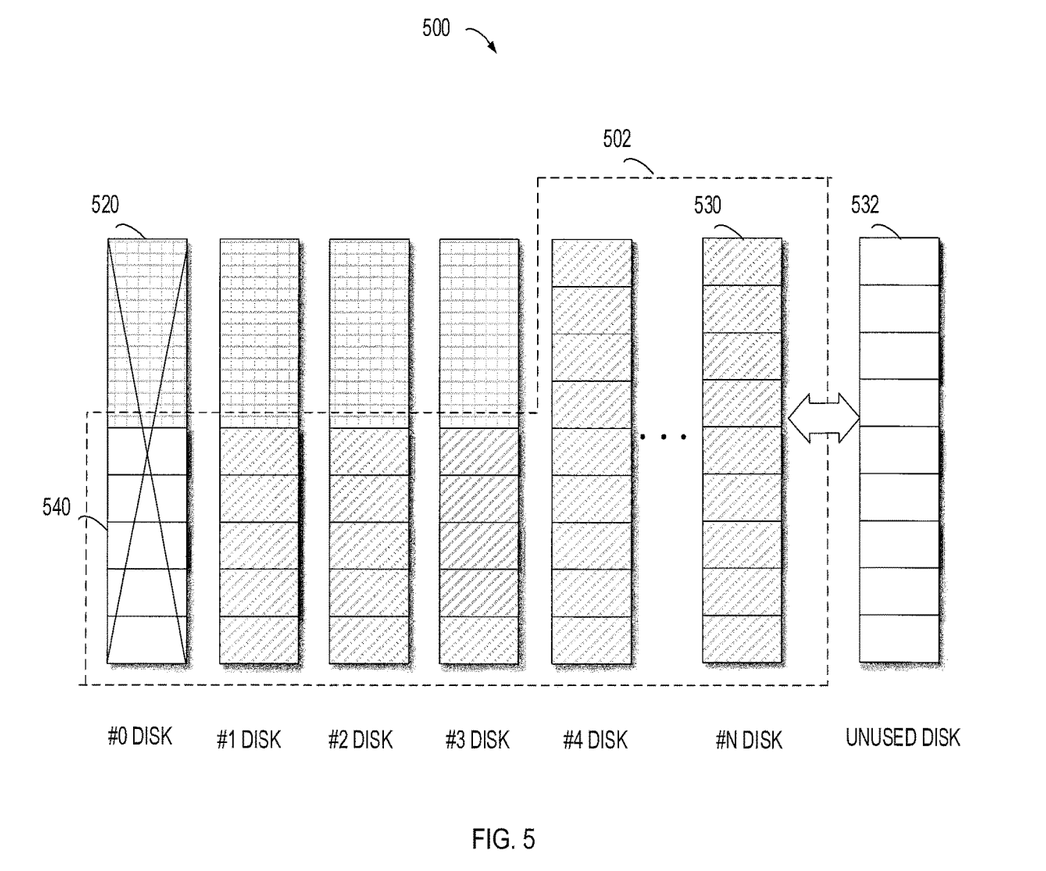
FIG. 5 illustrates a schematic diagram of a failure recovery method when a system disk and a user disk fail according to an embodiment of the subject matter described herein.

FIG. 5 illustrates a schematic diagram of a failure recovery method when a system disk and a user disk fail according to an embodiment of the subject matter described herein. In some embodiments, when it is determined that the failed disk includes a user disk in addition to one system disk, an unused disk associated with the extent pool is used to rebuild the data of the user disk. As shown in FIG. 5, the system disk 520 fails, the user data 540 on the system disk is rebuilt to #1 disk to #N disk, and then, one user disk 530 in the same extent pool 502 fails, whereupon the free storage space in the extent pool 502 is already insufficient to rebuild the data of the failed user disk 530. Hence, the system disconnects association of the user disk 530 and the extent pool 502 by performing the abovementioned disk swapping operation between the unused disk 532 and the failed user disk 530, namely, the disk 532 is swapped into the extent pool 502 to replace the disk 530. The data of the disk 530 is directly rebuilt on the disk 532; the system disk 520 still keeps associated with the extent pool 502, namely, the disk 520 still belongs to the extent pool 502 until the user uses the updated system disk to update or replace the failed disk 520. Then, after the system disk is physically replaced with the updated system disk, recovery of the system data of the updated system disk is completed, and the rebuilt user data is restored from the one or more further disks to the updated system disk.

In some embodiments, when it is determined that the failed disk not only includes system disks, and the number of the failed system disks exceeds a threshold number (e.g., larger than or equal to 2, i.e., more than two system disks fail), read/write I/O of all disks is stopped until the system disk is replaced by the updated system disk; and the storage device is restarted. For example, after one system disk fails, a second system disk fails before the user physically replaces the first failed system drive, a disk (or data storage) array of the storage device will enter a repair mode. All data service will stop in this mode until the client removes the serious failure by using a new disk to replace the two failed system disks. Then, the system restarts and exits the repair mode, the system data will be rebuilt to the updated system disk, and the extent pool will directly rebuild the user data to the updated system disk.

At this time, to ensure the user's data safety, the system will stop read/write I/O service of all disks, until the two failed system disks are physically replaced with updated system disks. Then, the storage device is restarted to perform data rebuilding of the updated system disks. With the above technical means (e.g., specialized circuitry), when more than two system disks fail, namely, in the case that the number of normal system disks for system data redundancy storage in the storage device is limited, it is possible to quickly remind the user to perform physical replacement of the system disk to ensure the user system data safe, and avoid loss of the system data caused by untimely replacement of the failed system disks.

The following can be obtained by comparing the conventional storage device failure recovery solution shown in FIG. 1 and the failure recovery solution for the storage device of the embodiment of the subject matter described herein as shown in FIG. 3: in FIG. 1, the free storage space 134 existing on the user disk 132 for data rebuilding and the free storage space 154 existing on the updated system disk 150 are both not used sufficiently so that the overall I/O performance of the system falls. In FIG. 3, the storage spaces of all disks in the extent pool including the updated system disk 310 and user disk 230 are all used sufficiently, and each disk further has free storage space, for example, the updated system disk 310 further has the free storage space 344, and the user disk 230 further has the free storage space 246. It can be seen that the method for failure recovery of the storage device in the embodiment of the subject matter described herein can not only effectively use the storage space of the user disk and the replaced updated system disk in the storage device, but also avoids the problem that I/O concentrates in partial extents and fails to substantially evenly distribute in the whole disk space, thereby improving the I/O performance of the whole storage system, particularly improving the performance of I/P per second (TOPS).

Figure 6:
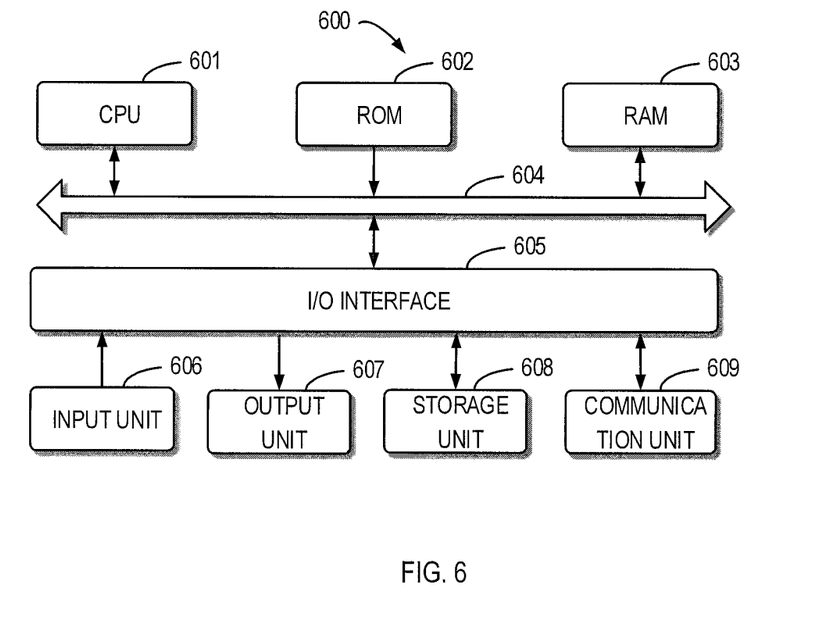
FIG. 6 illustrates a block diagram of an electronic device adapted to implement an implementation of the subject matter described herein.

FIG. 6 illustrates a block diagram of an electronic device 600 adapted to implement an implementation of the subject matter described herein. The device 600 may be used to implement the system for executing the failure recovery method 400 for the storage device shown in FIG. 4. As shown in FIG. 6, the device 600 includes a central processing unit (CPU) 601 which is capable of performing various actions and processes in accordance with a computer program instruction stored in a read only memory (ROM) 602 or a computer program instruction loaded from a storage unit 608 to a random access memory (RAM) 603. In the RAM 603 are stored various programs and data as required by operation of the device 600. The CPU 601, the ROM 602 and the RAM 603 are connected to one another via a bus 604. An input/output (I/O) interface 605 is also connected to the bus 604.

The following components of the device 600 are connected to the I/O interface 605: an input unit 606 including a keyboard, a mouse, or the like; an output unit 607 including various displays, loudspeakers and the like; the storage unit 608 such as a disk, an optical disk or the like; a communication unit 609 such as a network card, a modem, a wireless communication transceiver or the like. The communication unit 609 allows the device 600 to exchange information/data with other devices through a computer network such as the Internet and/or various telecommunication networks.

The processing unit 601 performs various methods and processing described above, for example, performs the failure recovery method 400 for the storage device. For example, in some embodiments, the method 400 may be implemented as a computer software program, which is stored in a machine-readable medium, for example the storage unit 608. In some embodiments, part or all of the computer program may be loaded into and/or installed on the device 600 via the ROM 602 and/or communication unit 609. When the computer program is loaded to the RAM 603 and executed by the CPU 601, one or more operations of the method 400 described above may be performed. Alternatively, in other embodiments, the CPU 601 may be configured in any other proper manners (e.g., by virtue of a firmware) to perform one or more actions of the method 400.

It needs to be further appreciated that the present disclosure may be a method, an apparatus, a system and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The depictions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What are described are only preferred embodiments of the present disclosure, and not intended to limit the present disclosure. Those skilled in the art appreciate that the present disclosure may have various modifications and variations. Any modifications, equivalent substitutes and improvements within the spirit and principles of the present disclosure all fall within the protection scope of the present disclosure.

We claim:

1. A method for failure recovery of a storage device, comprising:
   determining, based on failure data indicating at least one failed disk, whether the at least one failed disk comprises a system disk associated with an extent pool of the storage device, the extent pool being built based on system disks and user disks;
   in response to determining that the at least one failed disk comprises the system disk, rebuilding user data of the system disk to one or more further disks associated with the extent pool; and
   in response to the system disk being replaced with an updated system disk, restoring the rebuilt user data from the one or more further disks to the updated system disk, an association of the system disk with the extent pool being maintained until the system disk is replaced by the updated system disk;
   wherein determining whether the at least one failed disk comprises the system disk associated with the extent pool comprises:
      determining whether a slot number of a failed disk of the at least one failed disk is a predetermined slot number;
      in response to determining that the slot number is the predetermined slot number, determining that the at least one failed disk comprises the system disk.

2. The method according to claim 1, further comprising:
   copying partial user data of a further disk associated with the extent pool to the updated system disk, such that each disk associated with the extent pool has a free storage space.

3. The method according to claim 1, wherein the failure data at least comprises at least one of the following:
   a slot number of the at least one failed disk,
   a number of the at least one failed disk, and
   a failure duration of the at least one failed disk.

4. The method according to claim 1, wherein rebuilding the data of the system disk to the one or more further disks associated with the extent pool comprises:
   comparing a failure duration of the system disk with a predetermined duration;
   in response to the failure duration exceeding the predetermined duration, rebuilding all data of the system disk to the further disk; and
   in response to the failure duration not exceeding the predetermined duration, rebuilding changed data of the failed system disk to the system disk.

5. The method according to claim 1, further comprising:
   in response to determining that a number of system disks comprised in the at least one failed disk exceeds a threshold number, stopping read/write I/O of all disks until the system disks is replaced by the updated system disk; and
   restarting the storage device.

6. The method according to claim 1, further comprising:
   in response to determining that the at least one failed disk further comprises a user disk, rebuilding data of the user disk using an unused disk associated with the extent pool.

7. An apparatus for failure recovery of a storage device, comprising:
   a storage unit configured to store one or more programs;
   a processor coupled to the storage unit and configured to perform the one or more programs to cause the apparatus to perform acts comprising:
      determining, based on failure data indicating at least one failed disk, whether the at least one failed disk comprises a system disk associated with an extent pool of the storage device, the extent pool being built based on system disks and user disks;
      in response to determining that the at least one failed disk comprises the system disk, rebuilding user data of the system disk to one or more further disks associated with the extent pool; and
      in response to the system disk being replaced with an updated system disk, restoring the rebuilt user data from the one or more further disks to the updated system disk, an association of the system disk with the extent pool being maintained until the system disk is replaced by the updated system disk;
   wherein determining whether the at least one failed disk comprises the system disk associated with the extent pool comprises:
      determining whether slot number of a failed disk of the at least one failed disk is a predetermined slot number;
      in response to determining that the slot number is the predetermined slot number, determining that the at least one failed disk comprises the system disk.

8. The apparatus according to claim 7, the acts further comprising:
   copying partial user data of a further disk associated with the extent pool to the updated system disk, such that each disk associated with the extent pool has a free storage space.

9. The apparatus according to claim 7, wherein the failure data at least comprises at least one of the following:
   a slot number of the at least one failed disk,
   a number of the at least one failed disk, and
   a failure duration of the at least one failed disk.

10. The apparatus according to claim 7, wherein rebuilding the data of the system disk to the one or more further disks associated with the extent pool comprises:
    comparing a failure duration of the system disk with a predetermined duration;
    in response to the failure duration exceeding the predetermined duration, rebuilding all data of the system disk to the further disk; and
    in response to the failure duration not exceeding the predetermined duration, rebuilding changed data of the failed system disk to the system disk.

11. The apparatus according to claim 7, the acts further comprising:
    in response to determining that a number of system disks comprised in the at least one failed disk exceeds a threshold number, stopping read/write I/O of all disks until the system disk is replaced by the updated system disk; and
    restarting the storage device.

12. The apparatus according to claim 7, wherein the acts further comprise:
    in response to determining that the at least one failed disk further comprises a user disk, rebuilding data of the user disk using an unused disk associated with the extent pool.

13. A computer program product having a non-transitory computer readable medium which stores a set of instructions to perform failure recovery of a storage device; the set of instructions, when carried out by computerized circuitry, causing the computerized circuitry to perform a method of:
- determining, based on failure data indicating at least one failed disk, whether the at least one failed disk comprises a system disk associated with an extent pool of the storage device, the extent pool being built based on system disks and user disks;
- in response to determining that the at least one failed disk comprises the system disk, rebuilding user data of the system disk to one or more further disks associated with the extent pool; and
- in response to the system disk being replaced with an updated system disk, restoring the rebuilt user data from the one or more further disks to the updated system disk, an association of the system disk with the extent pool being maintained until the system disk is replaced by the updated system disk;
- wherein determining whether the at least one failed disk comprises the system disk associated with the extent pool comprises:
  - determining whether a slot number of a failed disk of the at least one failed disk is a predetermined slot number;
  - in response to determining that the slot number is the predetermined slot number, determining that the at least one failed disk comprises the system disk.

14. The computer program product of claim 13 wherein the each disk resides within a storage array; and
- wherein the method further comprises:
  - ascertaining that a number of failed system disks exceeds a predefined threshold number, and
  - in response to ascertaining that the number of failed system disks exceeds the predefined threshold number, transitioning the storage array from a servicing mode in which the storage array provides data storage service to a repair mode in which the storage array does not provide data storage service.

15. The computer program product of claim 13, further comprising:
- copying partial user data of a further disk associated with the extent pool to the updated system disk, such that each disk associated with the extent pool has a free storage space.

16. The computer program product of claim 13, wherein the failure data at least comprises at least one of the following:
- a slot number of the at least one failed disk,
- a number of the at least one failed disk, and
- a failure duration of the at least one failed disk.

17. The computer program product of claim 13, wherein rebuilding the data of the system disk to the one or more further disks associated with the extent pool comprises:
- comparing a failure duration of the system disk with a predetermined duration;
- in response to the failure duration exceeding the predetermined duration, rebuilding all data of the system disk to the further disk; and
- in response to the failure duration not exceeding the predetermined duration, rebuilding changed data of the failed system disk to the system disk.

18. The computer program product of claim 13, further comprising:
- in response to determining that a number of system disks comprised in the at least one failed disk exceeds a threshold number, stopping read/write I/O of all disks until the system disks is replaced by the updated system disk; and
- restarting the storage device.

19. The computer program product of claim 13, further comprising:
- in response to determining that the at least one failed disk further comprises a user disk, rebuilding data of the user disk using an unused disk associated with the extent pool.

20. A method for failure recovery of a storage device, comprising:
- determining, based on failure data indicating at least one failed disk, whether the at least one failed disk comprises a system disk associated with an extent pool of the storage device, the extent pool being built based on system disks and user disks;
- in response to determining that the at least one failed disk comprises the system disk, rebuilding user data of the system disk to one or more further disks associated with the extent pool; and
- in response to the system disk being replaced with an updated system disk, restoring the rebuilt user data from the one or more further disks to the updated system disk, an association of the system disk with the extent pool being maintained until the system disk is replaced by the updated system disk;
- wherein rebuilding the data of the system disk to the one or more further disks associated with the extent pool comprises:
- comparing a failure duration of the system disk with a predetermined duration;
- in response to the failure duration exceeding the predetermined duration, rebuilding all data of the system disk to the further disk; and
- in response to the failure duration not exceeding the predetermined duration, rebuilding changed data of the failed system disk to the system disk.

* * * * *